United States Patent
Weller et al.

(10) Patent No.: US 6,854,772 B2
(45) Date of Patent: Feb. 15, 2005

(54) PLUG CONNECTION

(75) Inventors: Andreas Weller, Wissen (DE); Frank Breidenich, Bonn (DE); Rolf Janssen, Otzberg Hering (DE); Gregor Zielinski, Koenigswinter (DE); Juergen Moitzheim, Koenigswinter (DE); Juergen Hofmann, Melsungen (DE)

(73) Assignees: Kautex Textron GmbH & Co. KG, Bonn (DE); Volaplast Werner-Hoppach KG, Spangenberg (DE)

( * ) Notice: Subject to any disclaimer, the term of this patent is extended or adjusted under 35 U.S.C. 154(b) by 0 days.

(21) Appl. No.: 10/308,719

(22) Filed: Dec. 3, 2002

(65) Prior Publication Data

US 2003/0102667 A1 Jun. 5, 2003

(30) Foreign Application Priority Data

Dec. 4, 2001 (DE) .......................................... 101 59 280

(51) Int. Cl.[7] ............................................... F16L 37/00
(52) U.S. Cl. ........................... 285/314; 285/315; 285/84
(58) Field of Search ................................ 285/314, 315, 285/358, 359, 275, 84

(56) References Cited

U.S. PATENT DOCUMENTS

| | | | | |
|---|---|---|---|---|
| 2,468,849 A | * | 5/1949 | Trainor | 285/314 |
| 2,470,256 A | * | 5/1949 | McIlroy | 285/277 |
| 4,712,810 A | * | 12/1987 | Pozzi | 285/93 |
| 4,915,421 A | | 4/1990 | Dennany Jr. | |
| 5,110,013 A | | 5/1992 | Clark et al. | |
| 5,310,225 A | * | 5/1994 | Ruckwardt | 285/308 |
| 5,324,081 A | | 6/1994 | Umezawa | |
| 5,356,181 A | | 10/1994 | Shirogane et al. | |
| 5,368,275 A | | 11/1994 | Ketcham et al. | |
| 5,437,650 A | | 8/1995 | Larkin et al. | |
| 5,984,265 A | * | 11/1999 | Engdahl | 251/148 |
| 6,089,620 A | * | 7/2000 | Mota Lopez et al. | 285/322 |
| 6,558,084 B2 | * | 5/2003 | Moog et al. | 405/224 |
| 6,767,034 B2 | * | 7/2004 | Le Clinche | 285/319 |

FOREIGN PATENT DOCUMENTS

| | | | | |
|---|---|---|---|---|
| CH | 690 338 | | 7/2000 | |
| DE | 3603479 | | 5/1987 | |
| EP | 1033522 | | 1/2000 | |
| GB | 2 104 607 A | * | 3/1983 | 285/314 |

* cited by examiner

Primary Examiner—James Hewitt
(74) Attorney, Agent, or Firm—Grossman Tucker Perreault & Pfleger, PLLC

(57) ABSTRACT

A plug connection for hoses or pipes as for connecting washing fluid conduits in a motor vehicle comprises a plug receiving member for receiving a connecting plug portion. The connecting plug portion can be latched in the plug receiving member in such a way as to be secured against forces acting axially thereon. The plug receiving member has resilient or spring-loaded latching portions. A securing sleeve is arranged axially slidably on the outside of the plug receiving member. In a first position of the securing sleeve the latching portions are held in a receiving and latching position in which a connecting plug portion can be inserted into and latched in the plug receiving member. In a second position of the securing sleeve it permits the latching portions to move resiliently into a retracted open position for disengagement of an inserted connecting plug portion from the plug receiving member.

10 Claims, 4 Drawing Sheets

PLUG CONNECTION

FIELD OF THE INVENTION

The invention concerns a plug connection for conduits such as hoses or pipes.

In this specification the term conduit will be used generally to denote a hose or a pipe in that respect.

More particularly but not exclusively the invention concerns a plug connection for connecting a washing fluid conduit of a motor vehicle. In this respect a plug connection may be employed for connecting together two portions of washing fluid conduit to form a continuous conduit run, or for connecting a washing fluid conduit to a component such as a nozzle, pump or the like. The term connection is used in this specification for both connecting actions, that is to say interconnecting two conduit portions and connecting a conduit to another component.

BACKGROUND OF THE INVENTION

One form of plug connection for conduits and more particularly for connecting washing fluid conduits in a motor vehicle comprises a plug receiving means in the form of a socket-like member for receiving a connecting plug portion, for example in the form of a connecting stub with a bore therethrough for carrying the fluid flowing through the conduit. The connecting plug portion can be latched in the plug receiving means in a suitable opening therein, and secured therein to withstand forces acting axially thereon. Such a plug connection or coupling is frequently used in present day windshield or window washing systems and headlamp washing systems in motor vehicles.

A disadvantage with the kind of plug connection outlined above is that the latching elements for holding the connecting plug portion in the plug receiving means are usually difficult to handle. It frequently happens that the washing fluid tank, pump and like components are not freely accessible in the motor vehicle in which the system is installed so that the assembly procedure is faced with difficulties, caused by the fact that the structural space available is only limited. Plug connections which are designed to ensure sealing integrity in relation to pressure surges, for example for high-pressure headlamp washing installations, frequently require particularly high assembly and latching forces to fit the connection together. A corresponding application of force is generally required to release such a plug connection.

A further form of plug connection comprises a first coupling portion and a second coupling portion, in conjunction with a further retaining or latching element. The second coupling portion is generally biased by the retaining element as a separate component against an inward edge of the first coupling portion which is generally of a cup-shaped configuration. Pressure noses on the latching element pass through the first coupling portion into openings and engage behind a step on the second coupling portion. In such a unit the latching element is in the form of a flat ring portion and is made for example from spring steel.

A disadvantage with that form of coupling unit is that the latching element is difficult to grip. Therefore, the outside of the latching element generally has a tongue portion to which a tool can be fitted. That tongue portion however frequently results in damage to cables and conduits which might chaff against it. In addition a tool is also required to disengage the latching element.

Finally a further form of coupling for connecting washing fluid conduits is so designed that a C-shaped latching element can be clipped thereon in the assembled condition of the unit. The latching element has pressure noses which pass through the cup-shaped coupling element or plug receiving means. This part of the coupling which is in the form of a ring portion of plastic material can be gripped with the fingers and can be pressed into the coupling and released again by a rotational movement. Such a coupling however suffers from the disadvantage that initially there is no resistance to insertion movement when the parts of the coupling are being fitted into each other in the insertion direction and the arrangement does not provide for an audible indication that the connection has adopted the latched condition in which the components are fitted together by snap engagement. In addition a further handling procedure is required for fixing the latching element in place. Checking that the parts of the coupling are sealingly fitted into each other is also made more difficult by virtue of the fact that extremely small forces are required for inserting the parts of the coupling into each other.

SUMMARY OF THE INVENTION

An object of the invention is to improve a plug connection in terms of handling upon assembly and disassembly thereof.

Another object of the invention is to provide a plug connection so designed that it can be assembled with the application of moderate joining or latching forces without the requirement for a further working operation for securing the connection.

Still a further object of the invention is to provide a plug connection for conduits such as hoses or pipes which is easy to assemble and which affords a high-quality retention action in respect of the connected parts.

In accordance with the principles of the present invention the foregoing and other objects are attained by a plug connection for conduits such as hoses or pipes, for example for joining or connecting washing fluid conduits in a motor vehicle, comprising a plug receiving means for receiving a connecting plug portion which for example can have a fluid conduit connected thereto. The connecting plug portion is adapted to be latched in the plug receiving means in such a way as to be secured against forces acting axially thereon. The plug receiving means has resilient or spring-loaded latching elements selectively co-operable with the connecting plug portion. A securing sleeve is arranged on the exterior of the plug receiving means slidably in the axial direction thereof. The securing sleeve is slidable between a first securing position and a second releasing position. When the securing sleeve is in the first position the latching elements are held in a latching and receiving position in which the connecting plug portion can be inserted into and held latched in the plug receiving means. In the second position of the securing sleeve the securing sleeve permits resilient movement of the latching elements into a retracted open position to allow the connecting plug portion to be disengaged from the plug receiving means.

As will be apparent from an embodiment of the invention which is described in greater detail hereinafter, the above-outlined arrangement can provide a connection which is secured to withstand axial pulling forces acting thereon and which is resistant to a pressure surge in the fluid conduit, simply by the plug receiving means and the connecting plug portion being assembled together under the application of moderate assembly forces. The plug receiving means is held in the biased or operative latching position by the securing sleeve, prior to the assembly procedure. Release of the connection is possible only by displacement of the securing sleeve, for example by means of a tool. There is no need for a separate assembly step for securing the connection. When the securing sleeve is displaced axially into its second position the latching elements are released or they spring back into a position of completely clearing the internal cross-section of the plug receiving means so that the connecting plug portion can be easily disengaged therefrom and thus the plug connection can be disassembled without the application of force thereto.

In accordance with a preferred feature of the invention the latching elements comprise spring tongue portions which are preferably formed in one piece with the plug receiving means. The spring tongue portions each have a respective pressure nose protruding radially outwardly therefrom. In the first position of the securing sleeve therefore the pressure noses bear in a biased condition against the inside wall of the securing sleeve so that in their inwardly disposed operative position the spring tongue portions project into the internal cross-section of the plug receiving means.

In a preferred feature the securing sleeve is arranged non-detachably on the plug receiving means. For that purpose in accordance with a further preferred feature the plug receiving means may for example have a securing collar extending circumferentially thereof at the outside at an end of the plug receiving means. The securing sleeve has a circumferentially extending step at the inside thereof, whereby the securing collar and the step of the securing sleeve co-operate as an axially securing means.

Preferably the plug receiving means is provided at its outside periphery with at least one latching projection co-operable with latching grooves in the securing sleeve, the latching grooves defining and thereby fixing the respective operational positions of the securing sleeve. That ensures that the securing sleeve can adopt at least two clearly defined operational positions with respect to the plug receiving means.

Desirably both the plug receiving means and also the connecting plug portion are provided with axial bores for passing a fluid therethrough.

In another preferred feature the plug receiving means further includes a connecting plug portion which is integrally formed thereon and which is of a configuration corresponding to the said connecting plug portion which is intended to be received in the plug receiving means itself.

In another preferred feature of the plug connection according to the invention the axial bore in the plug receiving means has a receiving region of a preferably cylindrical configuration for receiving the connecting plug portion, the receiving region having a diametral step therein.

A sealing seat for the connecting plug portion can be provided in the region of the diametral step in the plug receiving means. For example a sealing ring can bear thereagainst, the sealing ring co-operating with a head of the connecting plug portion, the head being of a generally mushroom-shaped, conically tapering configuration.

Further objects, features and advantages of the invention will be apparent from the description hereinafter of a preferred embodiment.

DESCRIPTION OF THE PREFERRED EMBODIMENT

Figure 1:
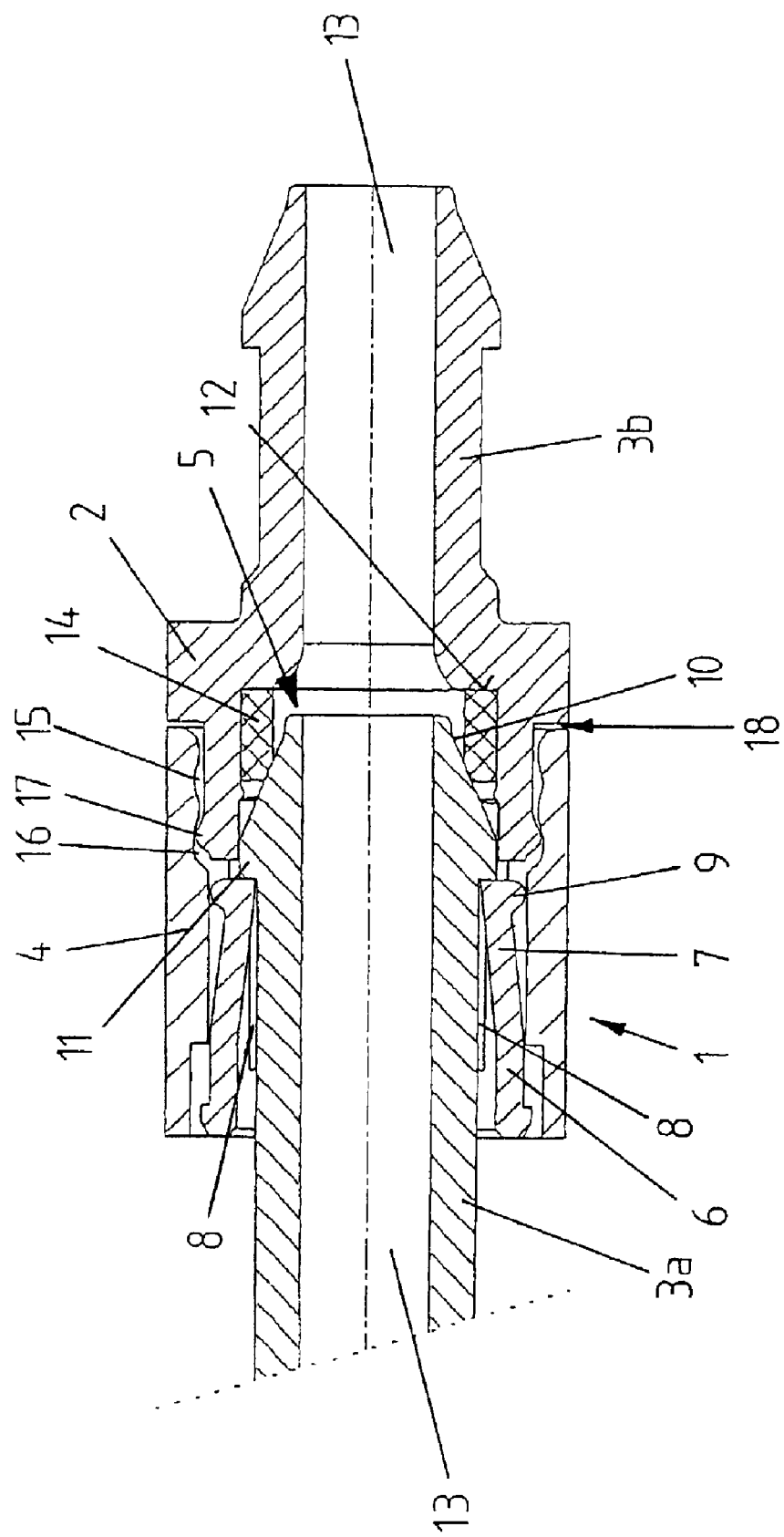
FIG. 1 is a sectional view of a plug connection according to the invention in the assembled and latched condition.

Referring generally to the drawing, a plug connection according to the invention which is generally identified by reference 1 in FIG. 1 includes a plug receiving means 2 in the form of a generally cup-shaped socket portion, a connecting plug portion 3a which can be inserted therein and a securing sleeve 4 arranged on the plug receiving means 2 on the exterior thereof slidably in the axial direction thereof. The plug connection 1 is designed for connecting together washing fluid conduit portions in a motor vehicle and/or for connecting a washing fluid conduit for example to a washing fluid nozzle, a pump or the like. The connecting plug portion 3a which is embraced by the plug receiving means 2 in the condition shown in FIG. 1 is inserted, at its end (not shown) remote from the plug receiving means 2, into a washing fluid conduit such as a flexible hose which is fixed thereon by crimping.

The plug receiving means 2 forms in its interior a hollow-cylindrical receiving region 5 and in the illustrated embodiment is further provided at its end remote from the receiving region 5 with a connecting plug portion 3b which is formed integrally thereon in the shape of a connecting stub. The connecting plug portion 3b, like the connecting plug portion 3a, is of a generally mushroom-shaped configuration in cross-section, of a conically tapering shape, and can also receive the end of a hose conduit thereon or can be inserted into a suitably designed counterpart coupling portion or into a suitably designed plug receiving means.

The above-described parts are all made from any suitable material, for example in the form of injection moldings of thermoplastic material.

Figure 2:
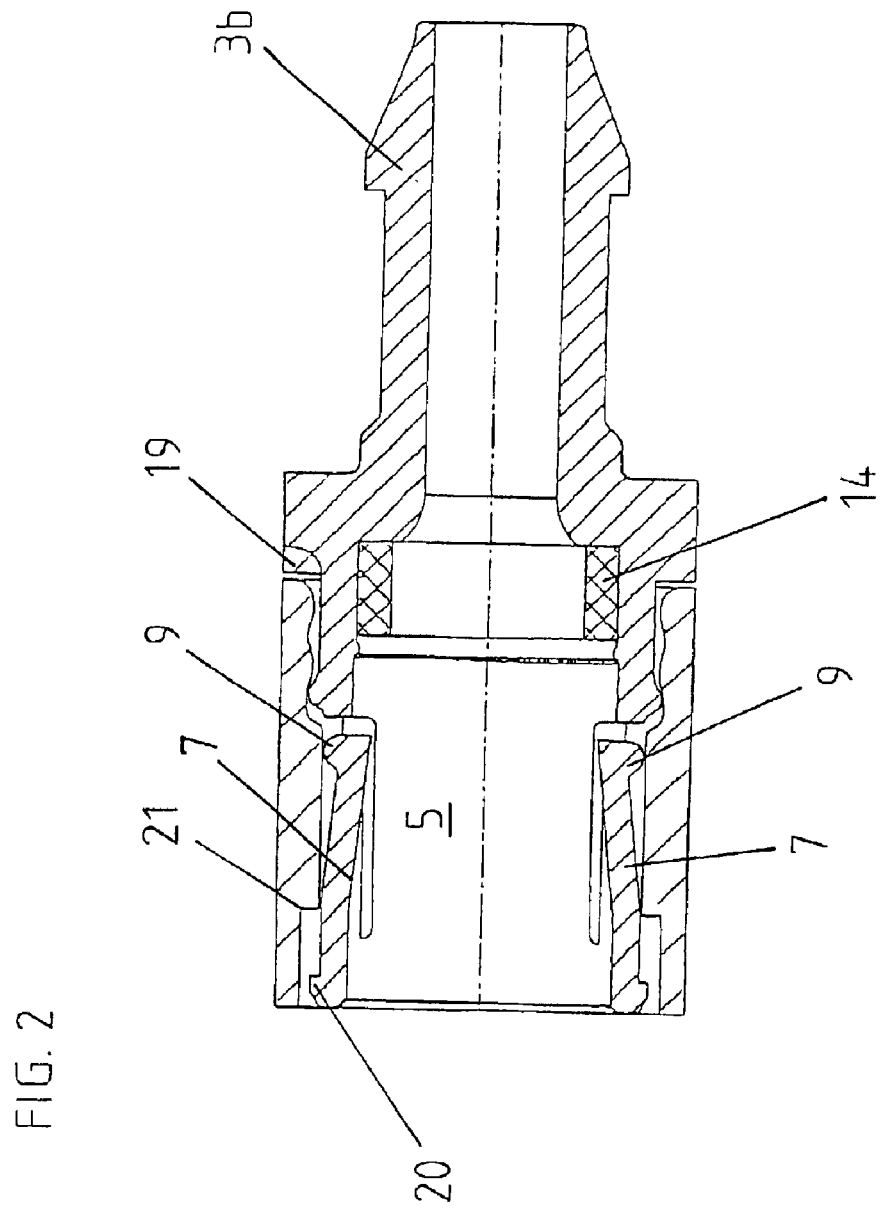
FIG. 2 is a view in section through the plug receiving means of the FIG. 1 plug connection in the receiving position.

Looking now more particularly at FIGS. 1 and 2, reference numeral 6 in FIG. 1 denotes the wall of the receiving region 5 of the plug receiving means 2, the region 5 being of a generally cylindrical or cup-shaped configuration. Provided in the wall 6 of the receiving region 5 are two mutually oppositely arranged spring tongue portions 7 operable to act as elastic retaining or latching elements. The spring tongue portions 7 are formed in one piece with the wall 6 of the plug receiving means 2, more specifically being formed by respective generally U-shaped openings 8 in the wall 6. The spring tongue portions 7 are each provided with a respective outwardly facing pressure nose 9. The pressure noses 9 cooperate in a manner to be described hereinafter with an internal contour configuration of the securing sleeve 4.

As can be clearly seen from FIGS. 1 and 2 the securing sleeve 4 which is fitted on to the outside of the plug receiving means 2 and which embraces it in the manner of a cuff is operable in a functional position thereof to urge the spring tongue portions 7 by way of the pressure noses 9 into the internal cross-section of the receiving region 5. When the securing sleeve 4 is in the locked position shown in FIGS. 1 and 2 which constitutes a receiving and latching position of the plug receiving means 2, the spring tongue portions 7 remain in the deployed position in which they are urged inwardly of the plug receiving means 2. When in that receiving and latching position of the plug receiving means 2 the connecting plug portion 3a is pushed into the receiving region 5, then firstly the conical peripheral surface 10 of the connecting plug portion 3a which is of a tapering generally mushroom-shaped configuration in cross-section encounters the spring tongue portions 7. When the force being applied to insert the connecting plug portion 3a is increased, then the inwardly disposed edges of the spring tongue portions 7 slide over the conical peripheral surface 10 and spring back into the cross-section of the receiving region 5 again, behind a peripherally extending step 11 on the connecting plug portion 3a. Insertion of the connecting plug portion 3a against the spring tongue portions 7 is possible, with outward radial deformation of the securing sleeve 4, by virtue of the elasticity of the sleeve deriving from the material used for same. That position then corresponds to the position shown in FIG. 1 in which the connecting plug portion 3a can no longer be pulled out of the plug receiving means 2 as the end faces of the spring tongue portions 7 bear against the face of the peripherally extending step 11 on the connecting plug portion 3a.

The receiving region 5 of the plug receiving means 2 has a diametral step indicated at 12 in FIG. 1. In the region of the step 12 the axial bore defined by the receiving region 5 communicates with an axial bore 13 in the connecting plug portion 3b, for fluid such as washing fluid to be passed therethrough. Bearing against the step 12 is a sealing ring 14 of soft-elastic material which is fitted into the receiving region 5 of the plug receiving means 2.

In the assembled and latched condition of the plug connection 1 as shown in FIG. 1 the tapering peripheral surface 10 of the connecting plug portion 3a bears in a biased condition against the sealing ring 14 so as to ensure a play-free and sealing fit for the conical peripheral surface 10 in the plug receiving means 2.

Figure 3:
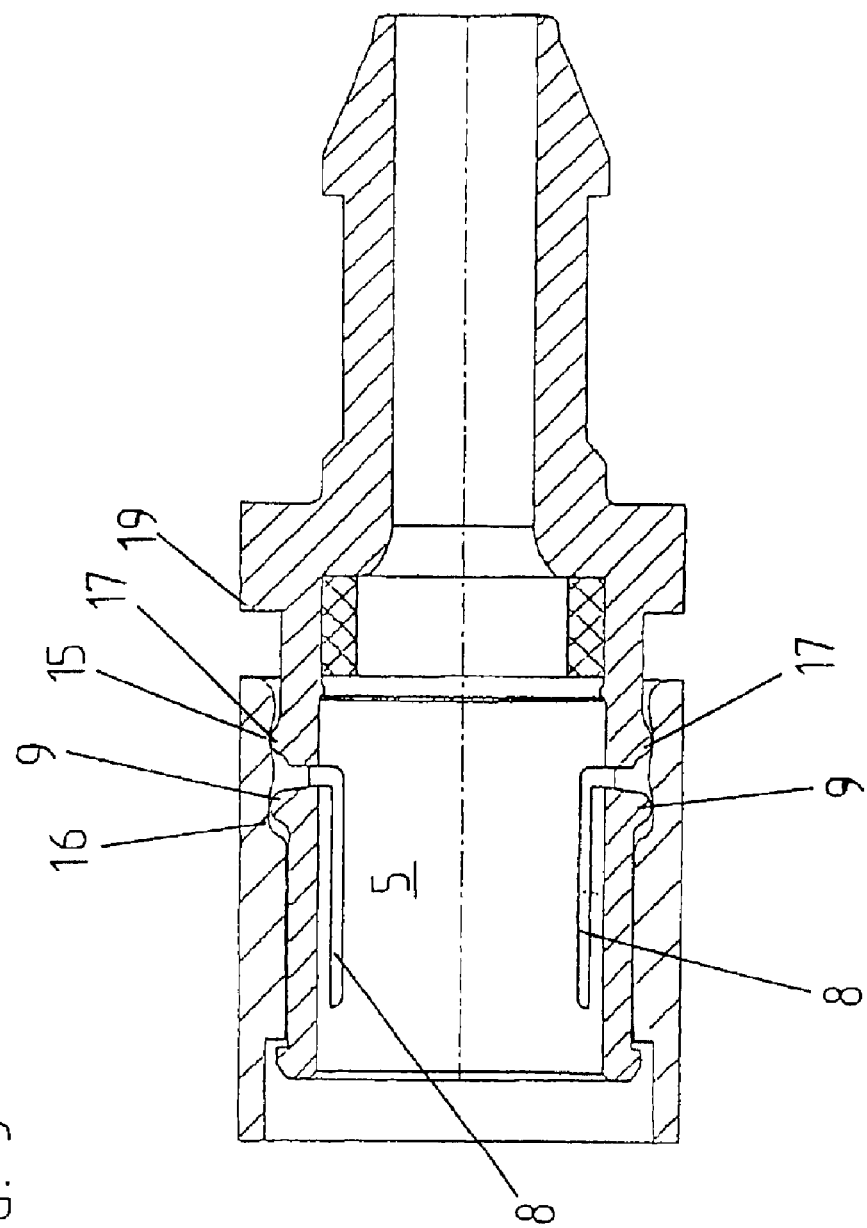
FIG. 3 is a view in section of the plug connection shown in FIG. 2 with a securing sleeve in the open position.
Figure 4:
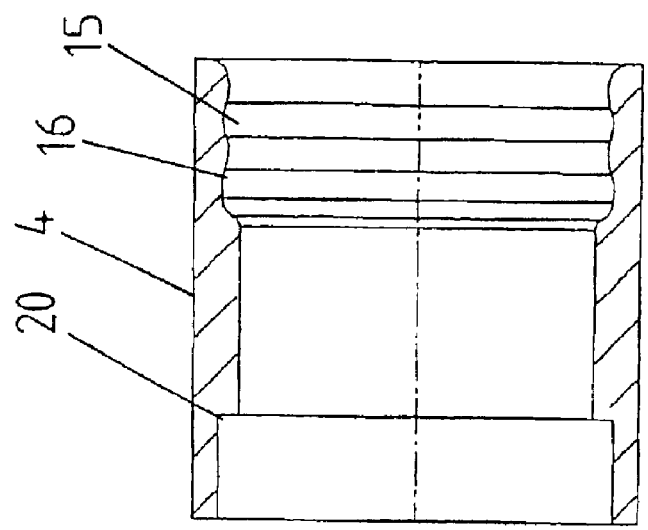
FIG. 4 shows a view in section through the securing sleeve.

Looking now more particularly at FIG. 4, it will be seen therefrom that the securing sleeve 4 is provided with retaining or latching grooves 15 and 16 which extend peripherally thereof at the interior thereof. The latching grooves 15, 16 are co-operable with a latching projection indicated at 17 in FIGS. 1 and 3, which is of a complementary configuration to the latching grooves 15 and 16. The latching projection 17 is provided on the outside surface of the plug receiving means 2. The co-operation of the latching grooves 15 and 16 and the latching projection 17 establish the respective functional positions of the securing sleeve 4.

A first latching groove 15 on the side of the securing sleeve 4, which is towards the connecting plug portion 3b, together with the latching projection 17, establishes the release position of the securing sleeve 4, while a second latching groove 16 which is arranged therebehind in the withdrawal direction of the connecting plug portion 3a from the plug receiving means 2, in conjunction with the latching projection 17, establishes the locking position of the securing sleeve 4.

In the locked position of the securing sleeve 4 which is shown in FIGS. 1 and 2, it bears flush against an external, circumferentially extending step indicated at 19 in FIG. 2 on the plug receiving means 2, forming a small gap 18.

By inserting a lever tool into the gap 18 the securing sleeve 4 can then be displaced away from the plug receiving means 2 into the position thereof as shown in FIG. 3. When the securing sleeve 4 is in that position the spring tongue portions 7 spring back into an initial position of clearing the internal cross-section of the receiving region 5. In that case the pressure noses 9 are disposed in the depression formed by the second latching groove 16 and the latching projection 17 is disposed in the depression formed by the first latching groove 15. With the securing sleeve 4 in that position the connecting plug portion 3a can be pulled out of the receiving region 5 of the plug receiving means 2, without any resistance worth mentioning to such withdrawal.

The plug receiving means 2 is delivered in the ready-to-assemble condition, in the configuration shown in FIG. 2, in which the spring tongue portions 7 are held by the securing sleeve 4 in a position of constricting the cross-section of the receiving region 5. In that position the connecting plug portion 3a can be inserted and latched in the position shown in FIG. 1.

At the insertion end it will be seen that the plug receiving means 2 is provided with a securing collar 20 which extends circumferentially of the plug receiving means at the outside thereof at its end and which can cooperate with an internally circumferentially extending step 21 of the securing sleeve 4 as a means for preventing it from being lost.

The above-described embodiment of the plug connection has been set forth in relation to use for connecting or joining conduits for carrying washing fluid in a motor vehicle, as for a windshield or headlamp washing system. It will be noted however that the plug connection according to the invention can be used generally for any suitable forms of hose or pipe requiring connection.

It will be appreciated moreover that the above-described embodiment of the invention has been set forth solely by way of example and illustration of the principles of the invention and that various modifications and alterations may be made therein without thereby departing from the spirit and scope of the invention.

What is claimed is:

1. A plug connection for a conduit comprising:
    a plug receiving means having an opening for receiving a connecting plug portion, the plug receiving means including biasable latching portions in the opening operable to latch the connecting plug portion in the plug receiving means to secure it against an axially acting force, each said spring tongue portion comprising a respective pressure nose protruding radially outward therefrom, said plug receiving means further comprising an outside periphery and at least one latching projection at said outside periphery; and
    a securing sleeve on the plug receiving means and slidable axially thereon between a first receiving position and a second position, said pressure noses bearing under a biasing force against an internal wall surface of said securing sleeve when said securing sleeve is in its first position, thereby holding the latching portions in an inwardly disposed receiving and latching position in which the connecting plug portion can be inserted into said receiving means by elastically deforming said securing sleeve radially outward and latched in said plug receiving means, and the securing sleeve in its second position permitting the latching portions to move under their bias into a retracted open position, said securing sleeve further comprising latching grooves being co-operable with said at least one latching projection of said plug receiving means for fixing said securing sleeve in one of said first position and said second position.

2. A plug connection as set forth in claim 1 wherein the latching portions are resiliently biasable.

3. A plug connection as set forth in claim 1 wherein the latching portions are biasable by spring loading.

4. A plug connection as set forth in claim 1 wherein said spring tongue portions are formed integrally with the plug receiver means.

5. A plug connection as set forth in claim 1 wherein the plug receiving means has a first end and a securing collar extending circumferentially of the plug receiving means at said first end, and wherein the securing sleeve has a circumferentially extending step at the interior thereof, the securing collar and the step of the securing sleeve co-operating as an axially securing means.

6. A plug connection as set forth in claim 1 wherein the plug receiving means and said connecting plug portion each have an axial bore therein for passing a fluid therethrough.

7. A plug connection as set forth in claim 6 wherein the axial bore in the plug receiving means has a receiving region and a diametral step in the receiving region.

8. A plug connection as set forth in claim 7 including a sealing seat for a said connecting plug portion in the region of said diametral step of the plug receiving means.

9. A plug connection as set forth in claim 1 wherein the plug receiving means has a connecting plug portion which is integrally formed thereon and which is of a configuration corresponding to said connecting plug portion receivable in the plug receiving means.

10. A plug connection for a conduit comprising a plug receiving means having an opening therein for receiving a connecting plug portion, the plug receiving means including resiliently deformable spring tongue latching portions in the opening displaceable between a retracted position of clearing the opening and an inwardly displaced position of extending into the opening to latch the connecting plug portion in the plug receiving means to secure it therein against an axially acting force, each said spring tongue portion comprising a respective pressure nose protruding radially outward therefrom, said plug receiving means further comprising an outside periphery and at least one latching projection at said outside periphery; and a securing sleeve on the plug receiving means and slidable axially thereon between a first receiving position and a second position, said pressure noses bearing under a biasing force against an internal wall surface of said securing sleeve when said securing sleeve is in the first position thereof, thereby urging said latching portions into their inwardly displaced position in which said connecting plug portion can be inserted into said receiving means by elastically deforming said securing sleeve radially outward and latched in said plug receiving means, and the securing sleeve in its second position permitting the latching portions for resilient outward displacement thereof into their retracted position for disengagement of the connecting plug portion from the plug receiving means, said securing sleeve further comprising latching grooves being co-operable with said at least one latching projection of said plug receiving means for fixing said securing sleeve in one of said first position and said second position.

* * * * *

UNITED STATES PATENT AND TRADEMARK OFFICE
CERTIFICATE OF CORRECTION

PATENT NO.    : 6,854,772 B2
DATED         : February 15, 2005
INVENTOR(S)   : Weller et al.

It is certified that error appears in the above-identified patent and that said Letters Patent is hereby corrected as shown below:

<u>Column 6,</u>
Line 34, after "biasable" insert -- spring tongue --.
Line 67, after "plug" delete "receiver" and insert -- receiving --.

<u>Column 8,</u>
Line 23, after "position" delete "permitting" and insert -- releasing --.

Signed and Sealed this

Twenty-eighth Day of March, 2006

JON W. DUDAS
*Director of the United States Patent and Trademark Office*